US011838772B2

(12) United States Patent
Mackenzie et al.

(10) Patent No.: US 11,838,772 B2
(45) Date of Patent: Dec. 5, 2023

(54) BASE STATION REPORT

(71) Applicant: BRITISH TELECOMMUNICATIONS PUBLIC LIMITED COMPANY, London (GB)

(72) Inventors: Richard Mackenzie, London (GB); Keith Briggs, London (GB); Salvador Diaz Sendra, London (GB); Michael Fitch, London (GB)

(73) Assignee: British Telecommunications Public Limited Company, London (GB)

( * ) Notice: Subject to any disclaimer, the term of this patent is extended or adjusted under 35 U.S.C. 154(b) by 435 days.

(21) Appl. No.: 17/309,281

(22) PCT Filed: Jul. 22, 2019

(86) PCT No.: PCT/EP2019/069718
§ 371 (c)(1),
(2) Date: May 14, 2021

(87) PCT Pub. No.: WO2020/098985
PCT Pub. Date: May 22, 2020

(65) Prior Publication Data
US 2021/0409978 A1 Dec. 30, 2021

(30) Foreign Application Priority Data
Nov. 15, 2018 (EP) .................... 18206575

(51) Int. Cl.
*H04W 36/00* (2009.01)
*H04W 36/30* (2009.01)
(Continued)

(52) U.S. Cl.
CPC ..... *H04W 24/04* (2013.01); *H04W 36/00835* (2018.08); *H04W 36/30* (2013.01); *H04W 36/32* (2013.01)

(58) Field of Classification Search
CPC . H04W 36/18; H04W 36/185; H04W 36/029; H04W 36/305; H04W 36/00835; H04W 36/008355
See application file for complete search history.

(56) References Cited

U.S. PATENT DOCUMENTS 9,826,444 B2  11/2017 Joseph et al.
2007/0026864 A1  2/2007 Singh
(Continued)

FOREIGN PATENT DOCUMENTS

WO  WO-2010090451 A2  8/2010
WO  WO-2014209885 A1  12/2014
(Continued)

OTHER PUBLICATIONS

3GPP TS 36.423 V15.1.0, "3rd Generation Partnership Project; Technical Specification Group Radio Access Network; Evolved Universal Terrestrial Radio Access Network (E-UTRAN);X2 application protocol (X2AP)," (Release 15) Mar. 2018, 355 pages.
(Continued)

*Primary Examiner* — Kevin Kim
(74) *Attorney, Agent, or Firm* — Patterson Thuente IP

(57) ABSTRACT

Systems and methods for operating a cellular telecommunications network. If determining that a first cell of a base station is about to reboot, performing a handover of one or more User Equipments from that cell to a second cell. After the reboot, the user equipment may be handed back to the rebooted cell.

If both cells are to reboot, a determination is made to identify which cell's reboot operation is to be prioritized, a handover of the user equipment attached to the prioritized cell to the other cell is made, the prioritized cell is rebooted, all the user equipments are handed over from the non-prioritized cell to the (now rebooted) prioritized cell, the non-prioritized cell is rebooted and the user equipment that was initially attached (Continued)

to the non-prioritized cell is handed over from the prioritized cell back to the now rebooted non-prioritized cell.

15 Claims, 6 Drawing Sheets

(51) Int. Cl.
*H04W 36/32* (2009.01)
*H04W 24/04* (2009.01)

(56) References Cited

U.S. PATENT DOCUMENTS

| | | |
|---|---|---|
| 2012/0014308 A1 | 1/2012 | Li et al. |
| 2014/0179325 A1 | 6/2014 | Xu et al. |
| 2016/0269954 A1* | 9/2016 | Purohit ............ H04W 36/0055 |

FOREIGN PATENT DOCUMENTS

| | | | |
|---|---|---|---|
| WO | WO-2018019356 A1 * | 2/2018 | ............ H04W 24/02 |
| WO | WO-2018077583 A1 | 5/2018 | |

OTHER PUBLICATIONS

Extended European Search Report for Application No. 18206575.5, dated Dec. 14, 2018, 9 pages.
Hunukumbure M., et al., "Handover Mechanisms for Planned Cell Outage in Twin State Green Wireless Networks," IEEE 73rd, IEEE, May 15, 2011, 5 pages. XP031896771,001. 1 0.11 09/VETECS. 2011.5956369.
International Search Report and Written Opinion for Application No. PCT/EP2019/069718, dated Sep. 19, 2019, 14 pages.
Office Action for GB Application No. 1818648.6, dated Apr. 9, 2021, 2 pages.
Office Action for GB Application No. 1818648.6, dated Apr. 17, 2019, 5 pages.
Office Action for GB Application No. 1818648.6, dated Dec. 18, 2020, 3 pages.

* cited by examiner

BASE STATION REPORT

PRIORITY CLAIM

The present application is a National Phase entry of PCT Application No. PCT/EP2019/069718, filed Jul. 22, 2019, which claims priority from EP Patent Application No. 18206575.5, filed Nov. 15, 2018, which is hereby fully incorporated herein by reference.

TECHNICAL FIELD

This invention relates to cellular telecommunications and in particular to the operation of cellular base stations.

BACKGROUND

In the LTE and 5G network architectures, each cell has a unique cell ID, but also a physical cell ID (PCI). The PCI allows for a user equipment (UE) to read the transmissions from a particular cell (known as an eNB in the LTE standard). This includes being able to decode enough oaf the physical layer to gather any further information (including the unique cell ID), in particular to read the cell's reference signals. Reading a cell's reference signals by a UE is one of the key ways that seamless mobility can occur in LTE networks (by giving accurate measurement reports), and also acts as a mechanism for a cell to optimize its transmissions to the UE (in particular for accurate CQI reporting). Essentially, without being able to read each cell's reference signals accurately it will degrade both link performance and mobility.

There are 504 PCIs available in LTE. These can be split into 168 identity groups, each group being of three identities (0-2), which can be identified from reading the primary synchronization sequence (PSS) of the cell. Which of the 168 identity group is used can be identified from reading the secondary synchronization sequence of the cell. After reading these synchronization signals a UE will then be aware of the cell's PCI and can therefore measure the cell-specific reference signals.

Generally, deployment of cells is arranged according to rules such that the separation between cells with the same PCI should be maximized, thus avoiding PCI conflicts. There are two types of PCI conflict: collisions, where two or more neighboring cells have the same PCI; and confusion, where a first cell (with a first PCI) has more than one neighbor all using the same (second) PCI.

Currently, cellular networks have relatively static configurations of base stations, and each base station may divide its coverage into a plurality of cells. Typically a macro network is designed by a radio planner and each macro cell will only have a few neighbors, so the above rules about avoiding conflicts and collisions can be applied effectively. However, future cellular telecommunications networks are expected to become more dynamic due to higher numbers of base stations, some of which will utilize technologies such as mobile base stations (e.g. in cars, trains, drones) and plug-and-play base stations having relatively small coverage areas (typically known as femto base stations), and temporary deployments (for instance to provide extra capacity for special events), in order to increase and dynamically change capacity. The future network base stations may also employ energy saving procedures, resulting in some base stations being switched out of use when demand is low. They may also be arranged to switch between different operating modes to provide support for a variety of use cases. This all means that configurations of base stations are becoming less static.

In such a "hetnet" environment allocation of PCIs becomes more difficult. For example a macro cell, as well as having a few macrocell neighbors, may also have many pico cells (in areas of high demand) and PCI planning becomes much more complicated.

Self-organizing Network (SON) capabilities allow a network to select and optimize its operating parameters without the need for manual planning. This can allow for an LTE network to grow and adapt with reduced operational expense. One of the key SON features for cell configuration is PCI selection. This allows a cell to select its own PCI based on the knowledge it has of the cells around it.

Another SON feature is Automatic Neighbor Relations (ANR) whereby a cell can learn about its neighbors and maintain a Neighbor Relationship Table (NRT) effectively. ANR uses UEs to report information about neighboring cells. A cell can also learn about its environment by doing radio environment monitoring (REM) scans. REM scans are essentially a UE receive chain integrated with the cell. The cell's NRT will contain the PCI and Cell ID of each known neighbor.

PCI pooling is a technique whereby a fixed range of PCIs is applied for a particular set of cells. By applying PCIs to different classes of cells (e.g. macro, pico, femto) it becomes easier for a cell to distinguish between these different classes and therefore maintain its NRT more effectively. PCI pooling can also be used to separate different vendors, thus preventing their PCI selection SON mechanisms from selecting conflicting PCIs with other vendors. The alternative approach is to allow multiple vendors to use the same pool, but then there is added risk of conflicts being created.

However, the dynamic behavior of these networks increases the chances of conflicts between the operating parameters of neighboring cells in the network. This may occur, for example, when the Physical Cell Identifier (PCI) of a cell already operational in an area conflicts with that of another cell becoming newly operational in an area, for example by moving into the area covered by the first base station or becoming operational (booting up) in that area.

Because of the already finite number of PCIs (504), and the PCI pooling mechanisms a cell will typically only have a small and finite number of PCIs from which to select. Thus PCI conflicts can occur frequently. In a high density cluster of femtocells PCI conflicts become a real concern for several reasons. One reason is that there is only a finite pool of PCIs available. Another is that each cell may have many neighbors and this number of neighbors can be changed at any time.

What classes as a conflict in this case could simply be a colliding PCI, but it could also include confusion, conflicts between PCIs with the same modulo value, and potentially other rules.

There are many mechanisms for a cell to gain information about its neighbors. However, there are few techniques which can identify if there is a PCI collision. Unfortunately this is probably the most disruptive conflict available.

In Femtocell environments, a common technique is that, should a cell fail to find a non-conflicting PCI then it will not transmit. However, if a base station determines that a conflict exists in the network, it may be able to change its operating parameters, specifically the PCI, to resolve the conflict. When a network management feature, or SON feature, determines that a cell needs to change its PCI, the base station must shut down some systems and re-initiate them ("reboot"). As a result any attached UEs will lose their connection to the base station and thus the network. It may be possible for the cell to hand over its connected users to another cell to maintain service. Although handover procedures are standardized, the technique to hand over UEs in the situation of a cell reboot are not, and so UE performance during a cell reboot may result in poor user experience. This also requires sufficient time to be available to manage the handovers before the reboot process can begin. If such time is not available, because the detected conflict is already present, an attached UE may not be able to hand over but will experience an interruption in service until it can reselect to another cell, or reconnect to the original base station when it has finished rebooting. In any case, any loss of service, even temporary, is undesirable and should be avoided.

It is known, for example, from International Patent specification WO10/090451, to manage a controlled reboot, by handing over UEs to another base station (eNB) during reboot. A new message type from the MME (mobile management entity) co-ordinating the operation of the base stations then initiates handovers back to the source eNB after it has come back into service (e.g. after a reboot). This requires significant control signaling between the rebooting base station, the MME, and the base station or base stations to which the UEs are to hand over, in particular to determine which base stations have the capacity to handle the extra traffic, and to identify which neighboring base stations are in range of each UE. After the re-boot, the UEs will each detect what appears to be a new cell (actually the original cell with its new identity) as suitable for hand over, as it is in the same place as the cell to which they were originally connected, and each will initiate the handover process, requiring yet more signaling overhead.

This overhead can become significant in situations when the mobile network has many cells requiring reconfigurations that require a reboot. In particular, scenarios include unplanned small cells in high density deployments (e.g. plug-and-play residential femtocells) and moving base stations (e.g. a small cell in a car or on a drone), resulting in frequent unplanned reconfigurations of channel allocations.

SUMMARY

According to the invention, there is provided a method of operating a cellular telecommunications network, the method comprising the steps of:

determining that a first cell of a first base station is to reboot; and, in response, performing a handover of a User Equipment from the first cell to a second cell of the first base station before the first cell reboots, wherein if it is determined that two cells of the first base station are to reboot, each cell having at least one user equipment attached,

- a determination is made to identify which cell's reboot operation is to be prioritized,
- a handover of the user equipment attached to the prioritized cell to the other cell is made,
- the prioritized cell is rebooted,
- the user equipment that was initially attached to the prioritized cell and the user equipment initially attached to the other, non-prioritized non-, cell are handed over from the non-prioritized non-prioritized non-cell to the rebooted prioritized cell
- the non-prioritized non—is rebooted
- the user equipment that was initially attached to the non-prioritized non-cell is handed over from the prioritized cell to the rebooted non-prioritized non-cell.

In embodiments of the invention a handover to the second cell is made only if the User Equipment is within the coverage area of the second cell (if the second cell has a coverage area that is not co-terminous with the first cell), and/or the second cell has sufficient capacity to support a service currently operating on the first base station.

A blind handover of the User Equipment may be made back to the first cell of the first base station when the first cell has rebooted.

If it is determined that handover of the User Equipment to the second cell of the first base station is not possible, a handover to a second base station may be forced. Where the second cell has available capacity for fewer User Equipments than are currently operating on the first cell, some User Equipments may be handed to the second cell, the remaining user equipments being handed over to the second base station. The User Equipments selected for handover to another cell of the first Base Station may be selected according to quality of connection between the user equipments and the second base station, for example if radio signal conditions to the second base station are such that it will initiate a handover back to the first base station when the first base station is detected after rebooting, Or may be selected according to services operating on the connections with the first cell.

When the first cell is rebooted, a handover of the User Equipment back to the first cell from the second cell or second base station may be performed. Transferring from the second base station may be performed in response to the second base station detecting that the first base station has completed rebooting, and may require a predetermined transfer threshold to be satisfied upon the first base station rebooting, or expiration of a predetermined timer.

The invention also provides a cellular base station, comprising radio interface equipment for the management of two or more cells, and configured to be capable of operating as the first base station in the process described above. Such a base station may also be configured to be capable of operating as the second base station, in co-operation with another base station operating as the first base station according to the invention This invention allows a multi-cell base station (that is, a base station that transmits to several distinct coverage areas, where each coverage area is recognized by UEs as a separate cell with its own PCI), on determining that one of its cells must reboot, to initiate a handover of the UEs on that cell to another one of its cells before the reboot is performed. Once the reboot is complete, the UEs can be transferred back to the original cell.

The invention allows a "self-controlled reboot" to take place in a way that minimizes the negative impact of the cell reconfiguration. As the source and target cells are both on the same base station, no other part of the network needs to be involved. When a reboot is required the invention ensures users maintain a service while the rebooting cell is unavailable, and that UEs are returned to the rebooted cell once it becomes available again. This invention allows user experience to be maintained and optimized in mobile networks when a cell reboot is required, and also allows network performance to be optimized, making the service more stable for users.

Embodiments of the invention have provision for two or more cells of the same base station to co-ordinate their reconfiguration operations should the need arise, and to have provision to selectively determine which UEs to hand over to other base stations should the base station have insufficient capacity or range to hand over all its served UEs to its own other cells.

If both carriers have the same coverage, efficiency can be improved by performing blind handovers, that is to say without first having to determine whether the UE can communicate using the new carrier.

BRIEF DESCRIPTION OF THE DRAWINGS

Embodiments of the invention will now be described with reference to the Figures, in which.

DETAILED DESCRIPTION

Figure 1:
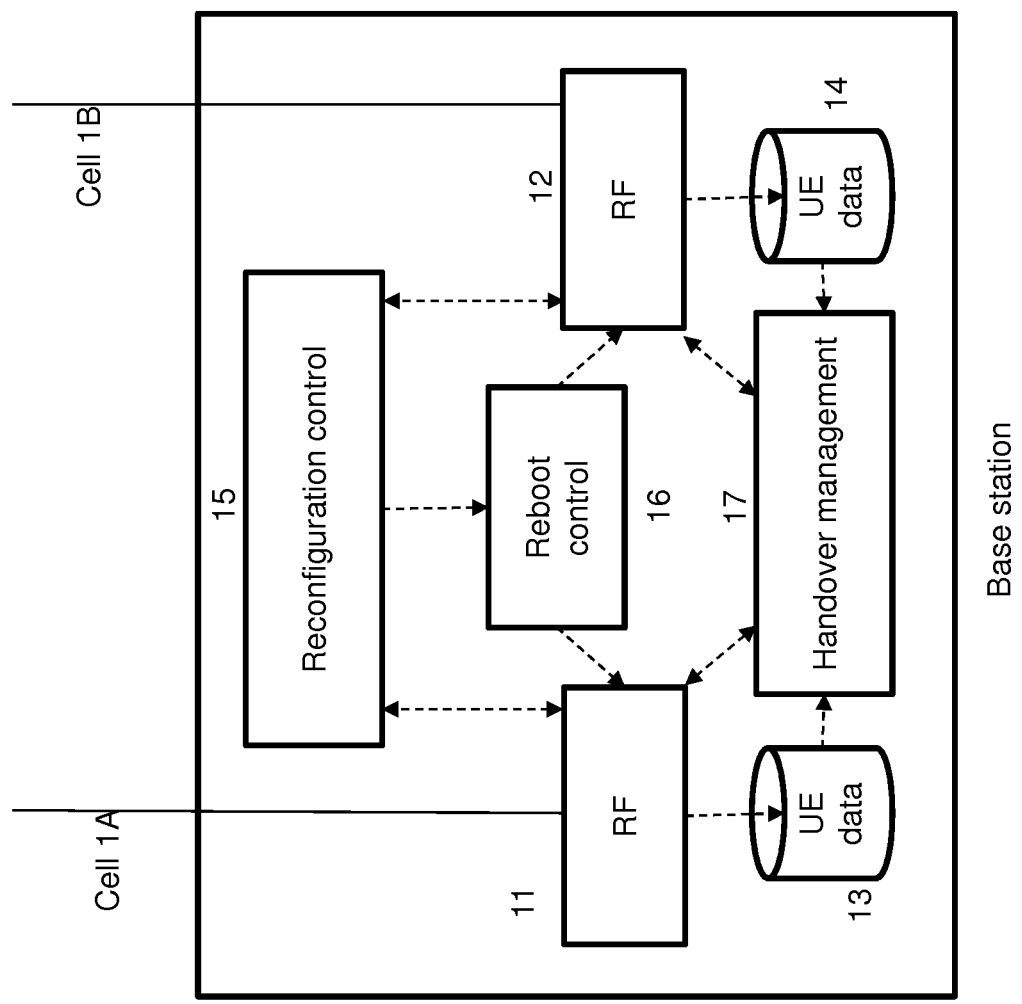
FIG. 1 is a schematic representation of a base station configured to operate according to the invention

FIG. 1 depicts the functional elements of a base station 1 configured to operate according to an embodiment of the invention. Only those elements relevant to the comprehension of the invention are depicted. In this simplified diagram, the base station has provision to operate on two cells 1A and 1B, each initially operating on respective carriers 1A 1B, and served by respective radio interfaces 11, 12 and having data stores 13, 14 recording details of any user equipments (UEs) currently attached to those cells. A handover management system 17 controls handover of UEs to and from the individual cells. A reconfiguration control function 15 responds to instructions either from a network-based entity or to local conditions such as detection by one of the RF interfaces 11, 12 of a conflicting cell, by reconfiguring the relevant RF interface to change its PCI and other channel characteristics. In order to do this the cell needs to reboot, and the reconfiguration control unit controls a reboot control function 16 to manage this.

The handover management system 17 is arranged to hand over UEs between the cells 1A, 1B of the same base station when a reboot is initiated. This handover can be simplified from the standard handover procedure because no other base station will be involved, so there is no need to co-operate with another base station and its handover management system, and if the cells have the same coverage also avoids the need to take any measurements or examine a neighbor list.

Figure 2:
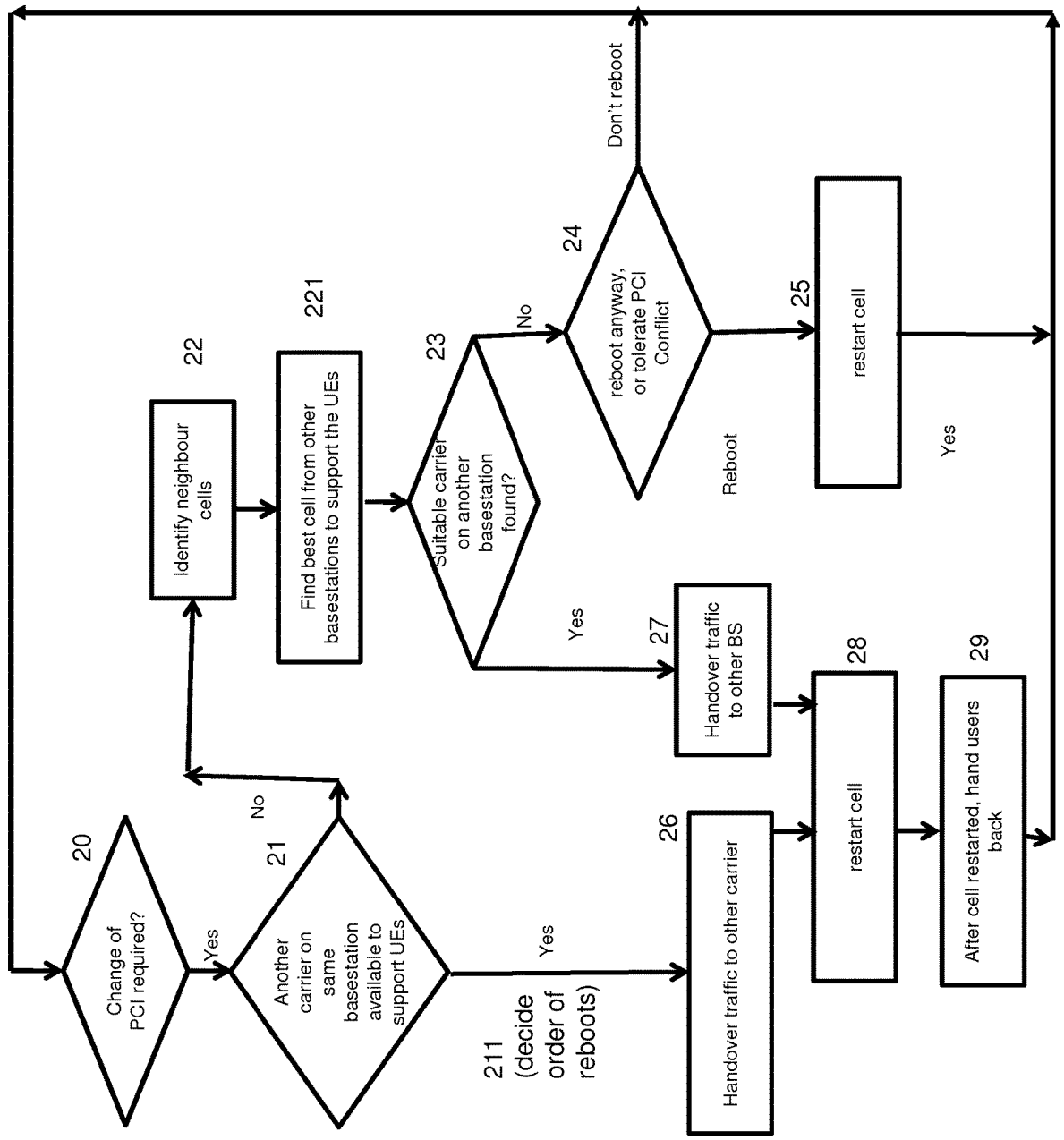
FIG. 2 depicts a basic procedure for arranging handovers according to this embodiment for a controlled reboot
Figure 3:
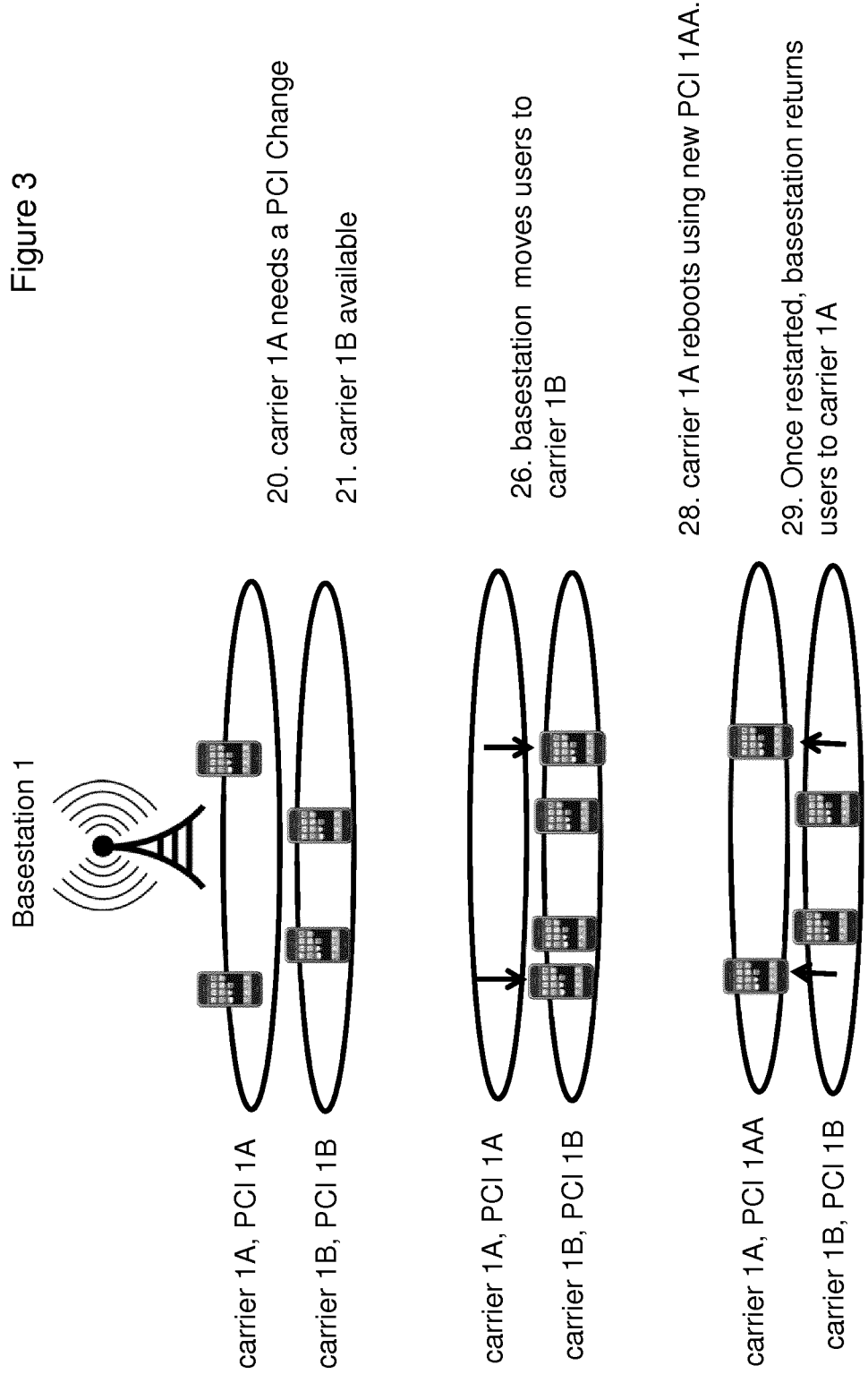
FIG. 3 shows the stages in the process when a dual carrier cell requires a cell reboot for one carrier.

FIGS. 2 and 3 depict a basic procedure for arranging handovers for a controlled reboot according to this embodiment. In this example, the reason for the reboot is for a PCI change.

In FIG. 3 and subsequent Figures, base stations are labelled 1, 2 respectively, and their respective carriers and their associated PCIs are labelled 1A, 1B, 2Z. Where a second PCI is applied to a carrier 1A, 1B, they are labelled 1AA, 1BB respectively.

On recognizing the need for a PCI change (step 20), for example because of a conflict with another base station using the same PCI that one of the cells 1A of the base station is using, the base station first determines whether it has another carrier available to which user terminals served by the cell 1A can be transferred (step 21). If no such carrier is available with sufficient capacity or coverage, but a suitable carrier is available on another base station (step 22, 23), some or all traffic is handed over to that base station (step 27).

The steps 21-26/27 are repeated for each user equipment, and the outcome at the decision point 21 may not be the same for all the UEs, for example because the second cell may lack the capacity or capabilities necessary to service some of the UEs attached to the first cell.

If only some UEs are to be handed over to another base station, the UEs to be handed over are selected (step 221, see FIGS. 5 and 6) according to criteria defining their suitability for such transfer. These criteria may relate to the factors such as vulnerability to corruption of the traffic they are carrying, or the signal quality between them and the candidate base station. If no carrier is available on any base station, a decision is made (step 24) either to reboot the cell with a new PCI, (step 25), (with a possible loss of connection with any UEs using the cell until they can establish a reconnection either to the rebooted cell or another cell in the area) or to continue to operate with the existing PCI despite the potential for conflict.

If another carrier 1B is available on the same base station, as depicted in FIG. 3, traffic is handed over to that carrier (cell) 1B (step 26), and the first cell 1A is restarted with a new PCI carrier 1AA (step 28). The users can then be handed back to the original new cell 1a with its new PCI 1AA (step 29).

Figure 4:
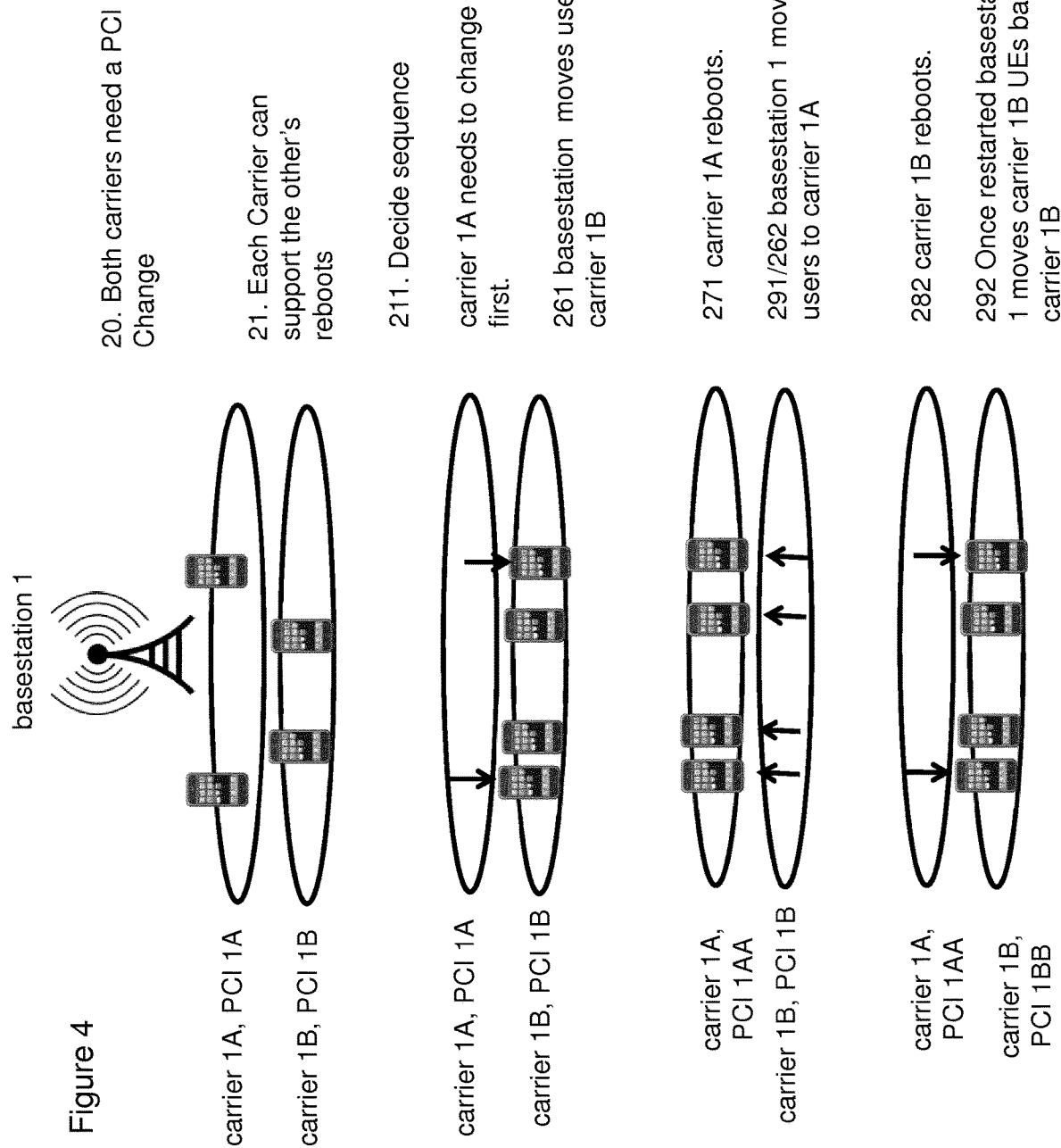
FIG. 4 shows the stages in the process when a dual carrier cell requires a cell reboot for two carriers.
Figure 5:
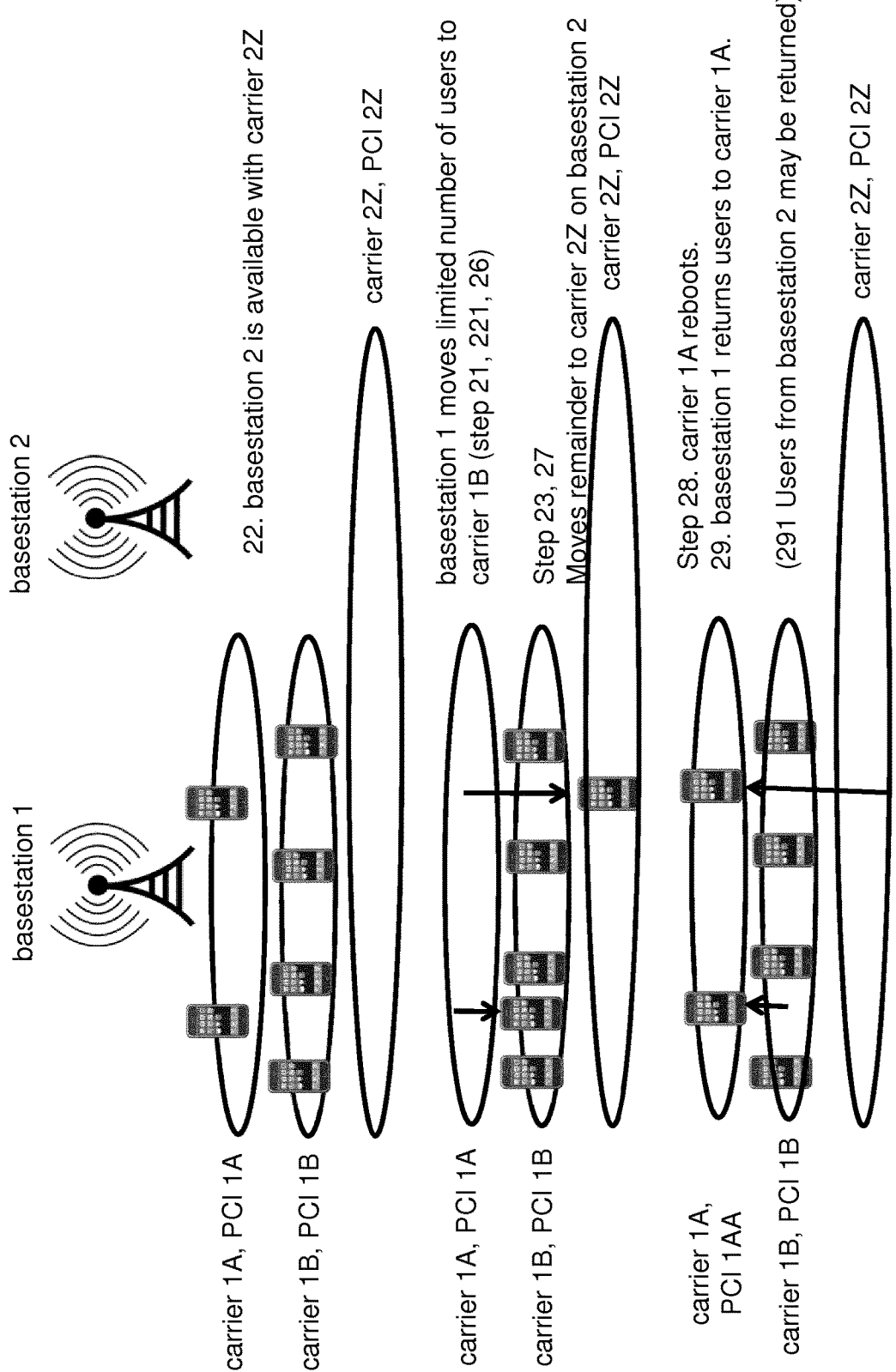
FIG. 5 shows the stages in the process when a dual carrier cell requires a cell reboot for one of its carriers, but the other carrier does not have the resource to support all the users of the first carrier.
Figure 6:
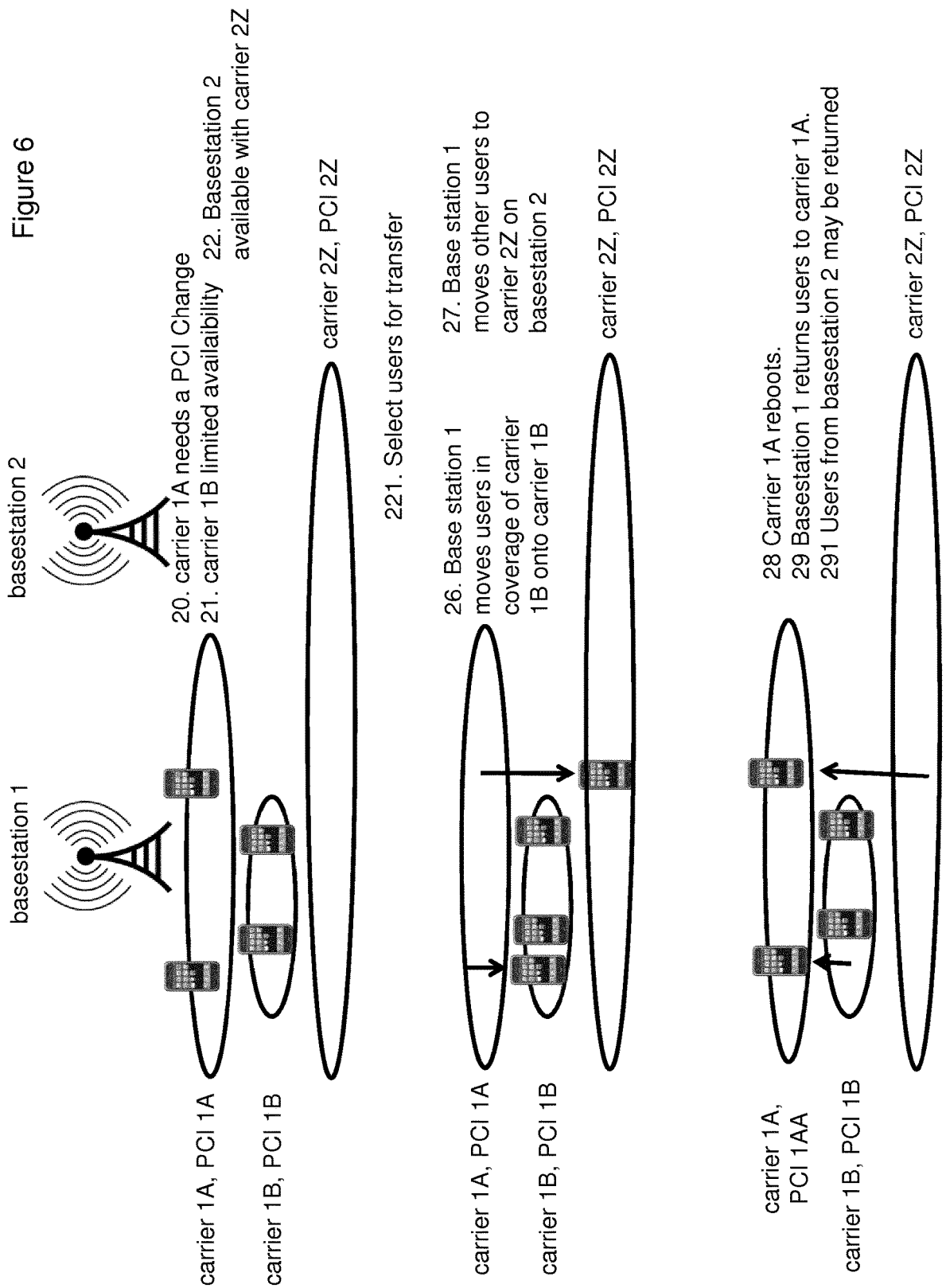
FIG. 6 shows the stages in the process when a dual-carrier cell requires a cell reboot for one carrier, when the coverage of the other carrier is less than, or only partially overlaps, the coverage of the first carrier.

The remaining FIGS. 4, 5 and 6 illustrate the configuration of the system at various stages of the process in more complex situations FIG. 4 shows the stages in the process when a dual-carrier cell requires a cell reboot for two of its carriers. In this instance the process of FIG. 2 is performed twice, once for each cell needing a re-boot. At step 21 it is determined that each carrier can support the traffic of both cells at the same time. An additional step (211) is then required to determine which cell should re-boot first. The order of reboot may be based on:

If conflict is predicted for the future, which cell will get into conflict soonest Which conflict is the most serious If reboot order improves the amount of handovers that can be self-controlled. For example high interference conflicts should be resolved first, even if it has relatively few users (and those users aren't in poor RF conditions), so that carrier can then support many users in subsequent carrier reboots, without the need to use carriers from another base-station.

The process then continues as before (steps 271, 281, 291). When the first cell 1 has rebooted, (step 281) all the UEs currently connected to the second cell are transferred from the second cell to the first cell, whether they were originally transferred from the first cell 1A and are now being transferred back (step 291) or they were originally operating in the second cell 1B (step 272). This then allows the second cell to reboot 1B (step 282). Once the second reboot has taken place the UEs originally working to the second cell 1B can be restored to that cell (step 292)

FIG. 5 shows the stages in the process when a dual-carrier cell requires a cell reboot for one carrier 1A, but the base station's other carrier 1B does not have the resource to support all the users of the first carrier. In this case, at the decision step 21, some of the UEs are handed over to the other carrier 1B (step 26) and the rest follow the path 22, 23 of seeking another carrier 2Z on another base station. The choice of which UEs to transfer, and which base stations to hand them over to, will depend on factors such as:

normal handover considerations such as signal quality whether the second base station 2 also has the reboot handover facility, which will allow ready transfer of the UEs back to the first base station 1, the nature of traffic being handled by the UE—some session types, such as voice calls and streamed videos, are less robust to interruptions than traffic such as plain text data sessions.

If both carriers have the same coverage, efficiency can be improved by performing blind handovers, that is to say without first having to determine whether the UE can communicate using the new carrier. However, if the carriers have different coverage, blind handover can only be managed from a cell with small coverage to a cell with a larger coverage completely overlapping the small cell. Handover in the reverse direction will require measurement reporting. In particular it should be noted that, by the nature of mobile communications devices, a UE transferred from a small to a large cell in a blind handover cannot be returned using a blind handover when that cell becomes available again, as it may not have remained within the range of the small cell. Conversely, if a UE is temporarily handed over from a large cell to a small cell lying entirely within it (a process which cannot be done as a blind handover), it can nevertheless be handed back using a blind handover as it must necessarily be within the range of the larger cell if it is within the smaller one.

If the other Base station 2 also has the reboot handover facility, it can also hand the UEs back to base station 1 when it detects that base station 1 has rebooted (step 291). However, it does not have the facility, it will go through the usual handover process including checks on RF conditions.

In this situation the first base station 1 may hand over UEs to a second base station 2 if one or both of the following conditions occur:

RF conditions to base station 1 are better than to base station 2.

Consequently the UE would hand back to the first base station when it has rebooted—particularly if carrier 1A and Carrier 1AA are the same frequency RF conditions for the UE at the second base station 2, are weak enough that the UE will be searching for another base station, and hence would be more likely to re-connect to the first base station.

The first base station will typically have a record in its neighbor list of measurement configuration settings of other base stations, and can therefore arrange for the handover to be to a second base station meeting one or both of these criteria.

FIG. 6 shows the stages in the process when a dual carrier cell requires a cell reboot for one carrier 1A (step 20), but the coverage of the other carrier 1B is identified to be less than, or only partially overlapping, the coverage of the first carrier. In such a case UEs that are identified (step 221) as not capable of connection to the second carrier 1B, either because of a lack of range or a lack of capacity of the second carrier, are transferred to one or more other base stations. In this illustration there is a single further base station with a carrier 2Z, but in practice two or more such further base stations may each receive some handed-over UEs depending on capacity and coverage areas.

In this case it cannot be assumed that the UE will still be within range of the first base station 1 when its cell 1A has rebooted.

At step 21 it is identified that a carrier 1B is available on the same base station and some of the UEs are handed over to that carrier (step 26). However, because of capacity or coverage limitations, other UEs have to be transferred to another base station (step 22, 23, 27). When the carrier 1A has rebooted (step 28), users operating on the second cell 1B are returned to the first cell 1. Users that were transferred to the second base station 2 (using carrier 2Z) may also be returned to the first cell 1A if the UE is still within range of the first cell (step 291).

The invention claimed is:

1. A method of operating a cellular telecommunications network, the method comprising:

a reconfiguration control system identifies a network conflict and determines that a first cell of a first base station is to be rebooted in order to change its operating parameters to resolve the network conflict; and, in response, a handover management system performs a handover of a User Equipment from the first cell to a second cell of the first base station before the first cell reboots;

wherein if the reconfiguration control system determines that two cells of the first base station are to reboot, each cell having at least one user equipment attached, it identifies one of the cells' reboot operation to be prioritized, if the non-prioritized cell is capable of supporting at least part of a service currently operating on the first cell at the same time as any services it is already handling, the handover management system performs a handover of the user equipment attached to the prioritized cell to the non-prioritized cell, the reconfiguration control system reboots the prioritized cell, the handover management system causes the user equipment that was initially attached to the prioritized cell and the user equipment initially attached to the non-prioritized cell to be handed over from the non-prioritized cell to the rebooted prioritized cell, the reconfiguration control system reboots the non-prioritized cell, and the handover management system causes the user equipment that was initially attached to the non-prioritized cell to be handed over from the prioritized cell to the rebooted non-prioritized cell.

2. The method of claim 1, wherein the second cell has a coverage area that is not co-terminous with the first cell, and a handover to the second cell is made if the User Equipment is within the coverage area of the second cell.

3. The method of claim 1, wherein a blind handover of the User Equipment is made back to the first cell of the first base station when the first cell has rebooted.

4. The method of claim 1, wherein a determination is made whether handover of the User Equipment to the second cell of the first base station is possible, handing over to the second cell if the handover is possible, and otherwise forcing a handover to a second base station.

5. The method of claim 4, wherein the second cell has available capacity for fewer User Equipments than are currently operating on the first cell, and wherein User Equipments are selected for handover to the second cell, and user equipments not selected are handed over to the second base station.

6. The method of claim 3, wherein the User Equipments to be handed over to another cell of the first Base Station are selected according to quality of connection between the user equipments and the second base station.

7. The method of claim 6, wherein user equipments are handed over to the second base station if radio signal conditions to the second base station are such that it will initiate a handover back to the first base station when the first base station is detected after rebooting.

8. The method of claim 3, wherein the User Equipments to be handed over to another cell of the first Base Station are selected according to services operating on the connections with the first cell.

9. The method of claim 1, further comprising:
rebooting the first cell; and, after the first cell has rebooted; and
performing a handover of the User Equipment back to the first cell.

10. The method of claim 3, further comprising:
rebooting the first cell; and,
after the first cell has rebooted, performing a handover of the User Equipment from the second base station back to the first cell in the first base station.

11. The method of claim 10, wherein the performing a handover of the User Equipment from the second base station back to the first cell in the first base station is performed in response to the second base station detecting that the first base station has completed rebooting.

12. The method of claim 10, wherein the performing a handover of the User Equipment from the second base station back to the first cell in the first base station is performed in response to a predetermined transfer threshold being satisfied upon the first base station rebooting.

13. The method of claim 10, wherein the performing a handover of the User Equipment from a second base station back to the first cell in the first base station is performed in response to expiration of a predetermined timer.

14. A cellular base station, comprising radio interface equipment for the management of two or more cells, and configured to be capable of operating as a first base station, the cellular base station comprising:

a reconfiguration control system identifies a network conflict and determines that a first cell of the first base station is to be rebooted in order to change its operating parameters to resolve the network conflict; and, in response,
a handover management system performs a handover of a User Equipment from the first cell to a second cell of the first base station before the first cell reboots;
wherein if the reconfiguration control system determines that two cells of the first base station are to reboot, each cell having at least one user equipment attached, it identifies one of the cells' reboot operation to be prioritized,
if the non-prioritized cell is capable of supporting at least part of a service currently operating on the first cell at the same time as any services it is already handling, the handover management system performs a handover of the user equipment attached to the prioritized cell to the non-prioritized cell,
the reconfiguration control system reboots the prioritized cell,
the handover management system causes the user equipment that was initially attached to the prioritized cell and the user equipment initially attached to the non-prioritized cell to be handed over from the non-prioritized cell to the rebooted prioritized cell,
the reconfiguration control system reboots the non-prioritized cell, and
the handover management system causes the user equipment that was initially attached to the non-prioritized cell to be handed over from the prioritized cell to the rebooted non-prioritized cell.

15. The cellular base station of claim 14, wherein the cellular base station is further configured to be capable of operating as the second base station when co-operating with another base station operating as the first base station, wherein the handover management system is further configured to:
determine whether handover of the User Equipment to the second cell of the first base station is possible, handing over to the second cell if the handover is possible, and otherwise forcing a handover to a second base station.

* * * * *